Aug. 28, 1934.  E. W. SEEGER  1,971,921
CONTROLLER FOR ELECTRIC MOTORS
Filed May 20, 1932  2 Sheets-Sheet 1

Inventor
Edwin W. Seeger
By Frank M Hubbard
Attorney

Patented Aug. 28, 1934

1,971,921

UNITED STATES PATENT OFFICE 1,971,921

CONTROLLER FOR ELECTRIC MOTORS

Edwin W. Seeger, Wauwatosa, Wis., assignor to Cutler-Hammer, Inc., Milwaukee, Wis., a corporation of Delaware Application May 20, 1932, Serial No. 612,483

8 Claims. (Cl. 172—179)

This invention relates to improvements in controllers for electric motors, and is particularly applicable to control of slip ring motors employed for driving printing presses.

As in printing press service it is frequently desired to effect plugging of such motors, disconnecting the same from circuit automatically when stopped, and the present invention has among its objects to provide improved means to effect such control.

A further object is to provide simple and reliable means to effect the aforementioned plugging control.

Other objects and advantages of the invention will hereinafter appear.

Certain embodiments of the invention are illustrated diagrammatically in the accompanying drawings and the same will now be described, it being understood that the invention is susceptible of modification without departing from the scope of the appended claims.

Figure 1:
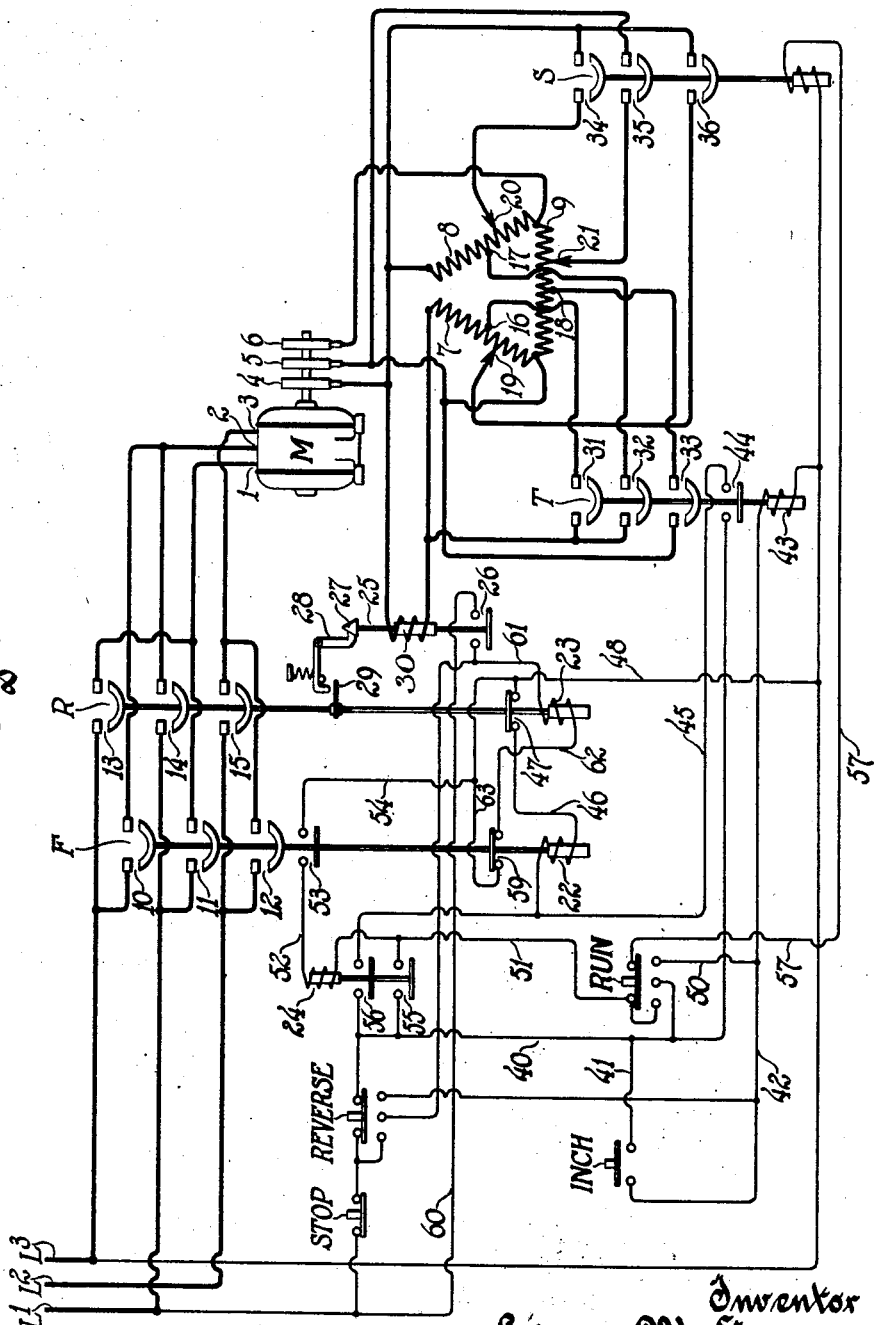
Figure 1 shows a substantially complete control scheme embodying the invention in one form.

Referring to Fig. 1, there is illustrated a three phase motor M having primary terminals 1, 2 and 3 and slip rings 4, 5 and 6. The primary of the motor is supplied from lines $L^1$, $L^2$, $L^3$ through reversing switches F and R, while the slip rings of the motor are connected to delta resistances 7, 8 and 9.

The forward switch F and the reversing switch R are each of the triple pole type, switch F having three sets of contacts 10, 11 and 12, and switch R having three sets of contacts 13, 14 and 15. As will be apparent, the contacts 12 and 15 of switches F and R are in parallel and provide for connection of the motor terminal 3 to line $L^2$. Contacts 11 of forward switch F provide for connection of the motor terminal 1 to line $L^1$, while contacts 10 provide for connection of the motor terminal 2 to line $L^3$. On the other hand, the contacts 14 of switch R provide for connection of the motor terminal 2 to line $L^1$, while contacts 13 provide for connection of the motor terminal 1 to line $L^3$ whereby said switches provide for reversal of the motor by reversing the connections between motor terminals 1 and 2 and lines $L^1$ and $L^3$.

The resistances 7, 8 and 9 connected to the slip rings of the motor have taps 16, 17 and 18, respectively, under the control of a triple pole torque switch T, said switch when closed short-circuiting a given amount of the resistance of the secondary circuit of the motor to provide for high torque starting. Also the resistances 7, 8 and 9 have respectively adjustable taps 19, 20 and 21 which are under the control of a triple pole speed switch S, said switch when closed providing for exclusion of a given amount of the secondary resistance of the motor for a predetermined running speed of the motor.

The system as thus far described is of a conventional form commonly used in printing press service, plugging being accomplished by opening the forward switch F and closing the reversing switch R with the switches T and S open for inclusion of all of the resistance in the secondary circuit of the motor. The switches F and R are provided respectively with operating windings 22 and 23 and the system illustrated has a commonly employed electroresponsive relay 24 having a purpose hereinafter set forth. However, the system as thus far described lacks means for properly controlling plugging of the motor and the means provided for this purpose will now be described. Said means comprises an electroresponsive relay 25 provided to maintain the reversing switch R energized until the motor is substantially stopped and then to deenergize the reversing switch to disconnect the motor from circuit.

The aforementioned relay 25 for controlling plugging comprises a set of contacts 26 to be engaged upon energization of said relay. The plunger of the relay has a head 27 to be engaged by a latch 28 when said relay is energized whereby said contacts 26 are latched in engagement subject to release from the latch by response of the reversing switch R, said switch having an extention 29 to trip latch 28, but only after the contacts of reversing switch R have touched to make circuit. As will later appear, the winding 30 of relay 25 is used to energize said relay whenever the motor is operated, the latch 28 affording means to hold the relay closed independently of the winding 30 until the reversing switch is closed whereupon the relay 25 will release except as it is held by the winding 30, said winding being so designed and connected as to release the relay only when the motor is substantially stopped.

Figure 2:
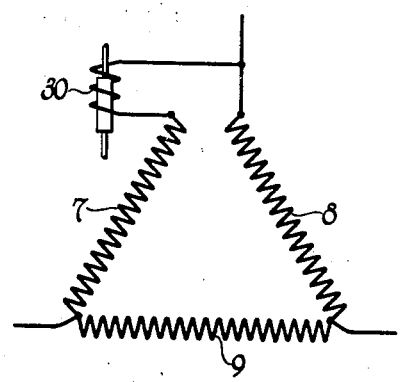
Figs. 2, 3 and 4 are simplified diagrams of certain connections provided for by the control shown in Fig. 1.

The winding 30 of relay 25 has permanent connections more readily apparent from Fig. 2, said winding being connected between secondary resistance 7 and its corresponding slip ring, namely slip ring 4, omitted from Fig. 2. Also the winding 30 has commutatable connections which will be more readily apparent from Figs. 3 and 4.

Figure 3:
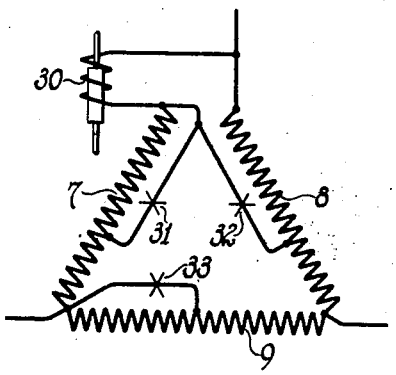

Referring to Fig. 3, the same shows commutation of the connections of winding 30 by closure of the torque switch T, the three sets of contacts of which are indicated by crosses 31, 32 and 33. These contacts, as heretofore set forth, short-circuit sections of resistances 7, 8 and 9 for high torque starting, and as will be apparent from Fig. 3 the contacts 31 and 32 establish a star connection between resistances 7 and 8 and winding 30 which provides for increase in the current supplied to said winding. Thus as the high torque switch T is always closed for starting the connection shown provides for an increased energization of the winding 30 to operate relay 25 upon starting of the motor. On the other hand, the high torque switch is closed only temporarily and when opened for running restores the connection shown in Fig. 2 whereby the potential impressed on the winding 30 is reduced but renders the winding effective to hold the relay closed as aforestated until the motor is brought substantially to rest, preferably until the motor speed is reduced to about 10% of normal.

Figure 4:
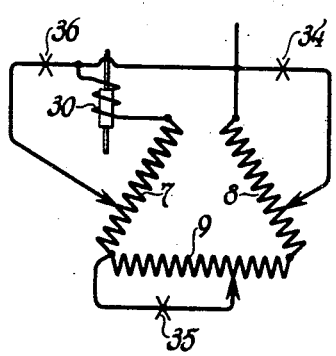

The further commutation of the connections of winding 30 shown in Fig. 4 is effected by the high speed switch S, the contacts of which are illustrated by crosses 34, 35 and 36, Fig. 4. As heretofore explained, the contacts of high speed switch S short-circuit predetermined portions of resistances 7, 8 and 9 for a high running speed of the motor and the contacts 36 of said switch are utilized to short-circuit the winding 30 of relay 25. While this commutation of the circuit of winding 30 is not essential it has been found desirable with relays which tend to chatter and as the switch S is always opened prior to energization of the reverse switch R for plugging the winding 30 may be excluded from circuit while switch S remains closed.

Considering the operation of the controller more in detail but without as yet considering the circuits in detail, provision is made for energizing the forward switch F and the high torque switch T to start the motor either for inching or for running. Starting of the motor for either purpose effects response of relay 25 and mechanical latching thereof in closed position. Assuming starting for inching, opening of the switch F for terminating inching operation completes the energizing circuit of reversing switch R through contacts 26 of the relay 25 and response of the reversing switch R trips the latch of the relay whereby continued energization of the reversing switch for plugging is dependent upon the action of relay winding 30. The relay winding 30 maintains the relay closed as aforestated until the motor is brought substantially to rest, whereupon the relay releases to deenergize the reversing switch R, thereby disconnecting the motor from circuit. Similarly when the motor is started for running the relay 25 responds and is latched-in pending deenergization of the forward switch for stopping whereupon the reversing switch is energized to complete plugging connections and to trip the mechanical latch of the relay 25. If in the meantime the high speed switch S has been closed it will short-circuit the winding 30, but the switch S will be opened to remove said short-circuit prior to energization of the reversing switch R whereby the relay 25 will time the duration of the plugging action as in the case of stopping after inching.

Considering the connections in further detail, and assuming closure of the "Inch" switch so designated on the drawings, circuit may be traced from line $L^1$ through a "Stop" push button switch and a "Reverse" push button switch, both so designated on the drawings, thence by conductors 40 and 41 through the "Inch" push button switch, by conductor 42 to and through the operating winding 43 of the torque switch to line $L^3$. The torque switch T is thus caused to respond to commutate the connections of the secondary winding of the motor as shown in Fig. 3. Also the torque switch upon responding engages its auxiliary contacts 44 to complete an energizing circuit for the forward switch F. This circuit may be traced from line $L^1$ through the "Stop" and "Reverse" push button switches, by conductor 40 through the auxiliary contacts 44 of torque switch T, by conductor 45 through the winding 22 of switch F, by conductor 46 through normally closed auxiliary contacts 47 of reverse switch R by conductor 48 to line $L^3$. Thus provision is made for closing the torque switch T and the forward switch F subject to deenergization of both upon release of the "Inch" push button switch. On the other hand, assuming depression of the "Run" push button switch, so designated on the drawings, circuit is completed from line $L^1$ through the "Stop" and "Reverse" push button switches by conductor 40 to the center down contact of the run switch, thence through said switch to the right, by conductors 50 and 42 to and through the winding of the torque switch T, as already traced. Torque switch T thereupon responds to energize the forward switch F and upon closure of the forward switch F circuit is completed through the winding of relay 24, this circuit being completed prior to release of the run switch. This circuit may be traced from the center down contact of the "Run" switch through said switch to the left, by conductor 51 through the winding of relay 24 by conductor 52 through auxiliary contacts 53 of the forward switch by conductors 54 and 48 to line $L^3$. Relay 24 in responding completes for itself through contacts 55 a maintaining circuit independent of the "Run" switch and through contacts 56 a maintaining circuit for the forward switch F independent of the "Run" switch, these circuits being so obvious as not to require tracing. Thus provision is made for maintaining running connections without requiring manual retention of any push button switch and when the run switch is released to return to its up position it deenergizes torque switch T and completes the energizing circuit of the high speed switch S, this circuit being traceable through the "Stop" and "Reverse" push button switches and the contacts 55 of relay 24 by conductor 51, through the up contacts of the "Run" switch, by conductor 57 through the winding of high speed switch S to line $L^3$.

As all of the running circuits above traced extend from line $L^1$ through the "Stop" push button switch it will be apparent that stopping may be effected by pressing said "Stop" switch to deenergize the forward switch, the high speed switch S and the relay 24. Under these conditions when the forward switch F opens its auxiliary contacts 59 complete the energizing circuit of the reversing switch R, this circuit being traceable from line L¹ by conductor 60 through contacts 26 of relay 25, by conductor 61 through the winding of reversing switch R, by conductor 62 through contacts 59 of forward switch F, by conductors 63 and 48 to line L³. The reversing switch R is thus closed for plugging subject to deenergization upon release of the relay 25, as aforedescribed. The "Reverse" push button switch provides for reversal at slow speed in the usual manner and requires no explanation.

Figure 5:
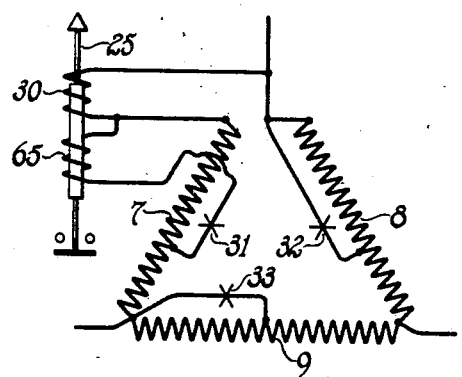
Fig. 5 illustrates a modification of the control scheme shown in Fig. 1.

Referring to Fig. 5, the same shows relay 25 provided with an additional winding 65, the winding 30 of said relay being permanently connected as in Fig. 2. The winding 65 is provided to afford increased power for closing the relay in lieu of commutating the connections of winding 30 as shown in Fig. 3. The winding 65 is adapted to be connected in series with the winding 30 by closure of the torque switch, the contacts 31 and 32 of which in this instance control separate circuits for short-circuiting sections of resistances 9 and 7, respectively. With this arrangement it will be observed that the winding 65 is included in circuit upon closure of the high torque switch in starting, and is excluded from circuit upon opening of the high torque switch which ordinarily occurs in a very short time.

Figure 6:
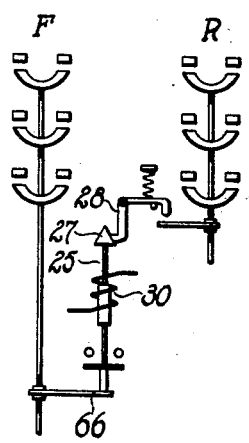
Fig. 6 illustrates a further modification of the control scheme shown in Fig. 1.

Referring to Fig. 6, the relay 25 is shown as adapted to be closed mechanically by response of the forward switch F, said switch having an extension 66 adapted to engage and lift the plunger of said relay to the latched-in position of said plunger. This mechanical operation of the relay renders unnecessary any provision for increasing the electrical power supplied to the relay for closing the same.

What I claim as new and desire to secure by Letters Patent is:

1. In combination, a motor, a control device, means for effecting operation of said motor in a given direction and for effecting setting of said device in a given position and restraint of said device against movement away from such position, the restraining means for said device comprising mechanical means and a winding connected to the motor circuit to be controlled by the electrical condition of said circuit, said winding constituting restraining means effective independently of said mechanical restraining means and means under the control of said first mentioned means and said control device to effect plugging of said motor and release of said device from said mechanical means to render said device operable subject to control by said winding to effect disconnection of said motor from circuit.

2. In combination, a polyphase motor, a control device, means for effecting operation of said motor in a given direction and for effecting setting of said control device in a given position and restraint of said device against movement away from such position, the restraining means for said device comprising a latch and a winding connected to the motor circuit to be controlled by the electrical condition of said circuit, said winding being effective independently of said latch to restrain said device, and means under the control of said first mentioned means and said device to complete plugging connections for said motor and to trip said latch, said winding releasing said device to effect disconnection of said motor from circuit when said motor is brought substantially to rest.

3. In combination, a motor, a control switch, means for effecting operation of said motor in a given direction and for effecting setting of said switch in a given position and restraint of said switch against movement away from said position, the restraining means for said switch comprising a latch and a winding in circuit with said motor, said winding being effective independently of said latch to restrain said switch, and an electroresponsive plugging switch for said motor dependent for energization upon given positioning of the first mentioned means and the aforementioned given positioning of said control switch, said plugging switch upon responding effecting tripping of said latch whereby continued energization of said plugging switch is under the control of said winding connected to the motor circuit.

4. In combination, a polyphase motor having resistances for its secondary circuit, means for effecting operation of said motor in a given direction including means to partially exclude said resistances temporarily for high torque starting, a relay having electroresponsive operating means including a retaining winding having permanent connections with the secondary circuit of said motor, said relay having control connections commutatable by said means affording high torque starting whereby said relay is caused to move to a given position upon starting and is rendered dependent upon said retaining winding for electromagnetic retention, mechanical means for retaining said relay in said given position and means under the control of said first mentioned means and said relay to complete plugging connections for said motor and to release said relay from said mechanical retaining means.

5. In combination, a polyphase motor having delta connected resistances for its secondary circuit, means for effecting operation of said motor in a given direction and for commutating the circuits of said resistances, a relay having a winding normally connected in a single phase of the secondary circuit of said motor and temporarily connected in a star relation with a plurality of the resistances of said motor in starting, said relay having a latch to retain it in the position to which it is moved by said winding, and means under the control of the first mentioned means and said relay to complete plugging connections for said motor and to trip the latch of said relay to render the latter releasable subject to control by said winding to effect disconnection of said motor from circuit.

6. In combination, a polyphase motor having delta connected resistances for its secondary circuit, means for effecting operation of said motor in a given direction and for commutating said resistances, a relay having a winding normally connected in a single phase of the secondary circuit of said motor and temporarily connected in a star relation with a plurality of the resistances of said motor in starting, said relay having a latch to retain it in the position to which it is moved by said winding, and means under the control of the first mentioned means and said relay to complete plugging connections for said motor and to trip the latch of said relay to render the latter releasable subject to control by said winding to effect disconnection of said motor from circuit, said first mentioned means insuring inclusion of the motor resistances for plugging and affording a short-circuit for said relay winding while certain running connections are maintained.

7. In combination, a motor, means for effecting operation thereof in a given direction, a relay having a winding which is permanently connected in circuit with said motor and a supplemental winding having control means by which it is included in circuit upon starting of the motor to insure response of said relay and thereafter is disconnected from circuit, a latch for said relay effective to hold the same following response thereof, and means under the control of the first mentioned means and said relay to complete plugging connections for said motor and to trip said latch to render said relay releasable subject to control by said first mentioned winding to effect disconnection of said motor from circuit.

8. In combination, a motor, means for effecting operation thereof in a given direction, a relay movable to a given position by operation of said means, said relay having a latch to retain it in said given position and also independent retaining means comprising a winding in circuit with said motor and means under the control of the first mentioned means and said relay to complete plugging connections for said motor and to trip the latch of said relay to render the latter releasable subject to control by its winding to effect disconnection of said motor from circuit.

EDWIN W. SEEGER.